UNITED STATES PATENT OFFICE.

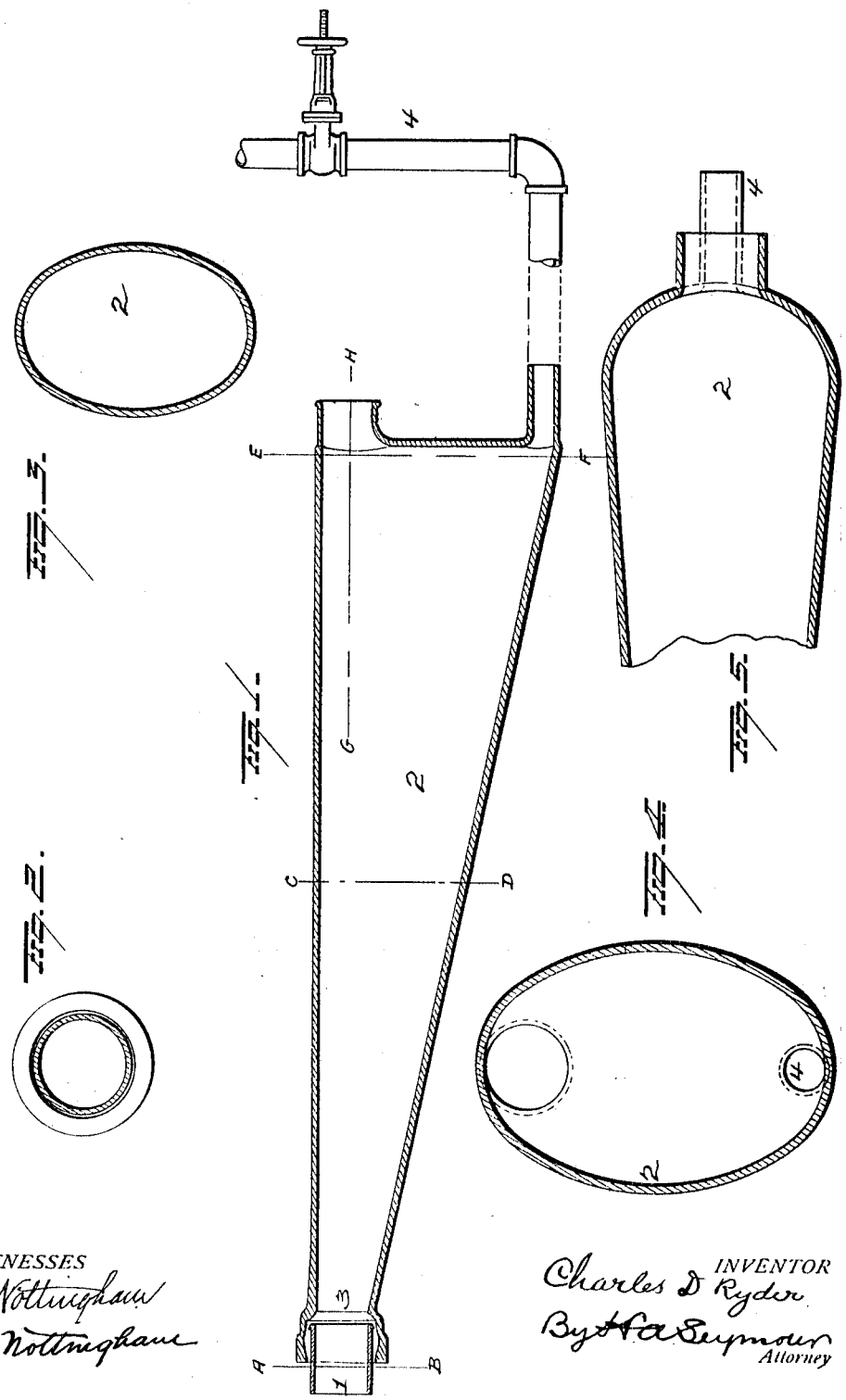

CHARLES DANIEL RYDER, OF STAMFORD, CONNECTICUT.

WATER-PIPE SYSTEM.

1,119,882.     Specification of Letters Patent.     Patented Dec. 8, 1914.

Application filed July 18, 1913. Serial No. 779,723.

*To all whom it may concern:*

Be it known that I, CHARLES D. RYDER, of Stamford, in the county of Fairfield and State of Connecticut, have invented certain new and useful Improvements in Water-Pipe Systems; and I do hereby declare the following to be a full, clear, and exact description of the invention, such as will enable others skilled in the art to which it appertains to make and use the same.

My invention relates to an improvement in water pipe systems, the object being to provide water mains with sediment traps into which sand and other solids carried by the water may settle, and from which the sediment may be forced by the pressure of the water in the system.

With this object in view my invention consists in the details of construction as will be more fully explained and pointed out in the claims.

In the accompanying drawings, Figure 1 is a view in longitudinal vertical section of my improved device. Fig. 2 is a view in transverse vertical section on the line A—B of Fig. 1. Fig. 3 is a view in transverse vertical section on the line C—D, Fig. 4 is a similar view on the line E—F of Fig. 1 and Fig. 5 is a view in horizontal section on the line G—H of Fig. 1.

1 represents a water main, and 2 my sediment trap, interposed between and connecting two sections of the main so as to form a continuation of the latter and through which all the water passing through the main must pass. This trap is approximately the size of the main at the intake end 3, and is enlarged both laterally and downwardly from the intake end to the outlet end, so that it forms an elliptical shape at the outlet end, whose horizontal diameter is considerably greater than the diameter of the main, and the depth of the trap at said outlet end, is several times greater than the diameter of the main. The top of the trap is horizontal and in the plane of the water main, while the bottom thereof gradually slopes downwardly from the inlet end to the outlet end, so that the lower end of said outlet end, is considerably below the main 1. The trap is provided at the extreme lower end of its outlet or larger end, with a blow-off pipe 4, which latter extends preferably upwardly to the surface, so that by opening the valve in said pipe, the pressure of the water in the main will force out the sediment in the trap and discharge it through the blow-off pipe. This blow off pipe may however communicate with a sewer, in which event the sediment will be discharged into the sewer.

As the trap 1 is of greater sectional area than the main, and is largest at its outlet end, it will be seen that the flow of water in the trap will be decidedly less rapid than the flow through the mains, and as the trap is gradually enlarged from its inlet to its outlet end, the flow of the water through the trap will be less rapid than the flow of the water in the main, thus allowing all solids carried by and held in suspension in the water, to settle down below the level of the mains before reaching the outlet end and finally settle to the bottom of the trap. The water in the trap below the outlet therein, is approximately still, so that after the solids settle below the level of the water main, they remain practically undisturbed until drawn off through the blow-out pipe.

By enlarging the trap from its inlet end to its outlet end, so that the flow through the trap will be less rapid than through the main, practically all, including the lighter solids, will fall by gravity to a plane below the moving volume of water at the top of the trap, before reaching the outlet, and as the water at the outlet end of the trap below the outlet opening is practically still or motionless, lighter solids so separated from the surface water will eventually settle at the bottom. The water in the trap will be under substantially the same pressure as the water in the main, hence in order to remove the sediment, it is simply necessary to open the valve in the blow-off pipe, which latter is considerably smaller than the main, thus permitting the pressure of the water in the main to force the sediment from the trap out through the blow-off pipe, with increased velocity.

While the drawings and description show my invention as applied to an ordinary water main, it is understood that I do not confine myself to such water main, but that the above invention with proper modifications can be applied to any system for transmitting water where it is desirable to get rid of sediment and that the spirit of my invention be applied to any pipe where such discharge of sediment is desired. Therefore in the following claims where I use the words "pipe system," I wish it understood that they apply to any form of pipe conveying water or any other liquid or gaseous substance from which it is desirable that sediment be removed. In using the term "blow-off pipe," I mean any conduit or means of discharge for the water or other liquid or gaseous substance carrying the sediment.

Having fully described my invention what I claim as new and desire to secure by Letters-Patent, is:—

1. The combination of a sediment trap forming a part of a pipe system, the said trap being enlarged laterally and downwardly from its inlet to its outlet end, and a blow-out pipe leading from the lowest point of its outlet end.

2. The combination of a sediment trap forming a part of a pipe system, the said trap being triangular in plan and also in side elevation, and having rounded edges, the inlet end being circular in cross section and the outlet end elliptical in cross section and deeper and wider than the inlet end, and a blow off pipe connected with the larger end of the trap at the bottom thereof.

3. The combination of a sediment trap forming a part of a pipe system, the said trap increasing in size laterally and downwardly from its inlet end, the outlet from the trap being at the top of its larger end, and a blow off pipe connected with the trap at the bottom of its larger end.

In testimony whereof, I have signed this specification in the presence of two subscribing witnesses.

CHARLES DANIEL RYDER.

Witnesses:
EDWARD W. BUCHANAN,
WM. M. FOORD.

Copies of this patent may be obtained for five cents each, by addressing the "Commissioner of Patents, Washington, D. C."